United States Patent Office 3,276,103
Patented Oct. 4, 1966

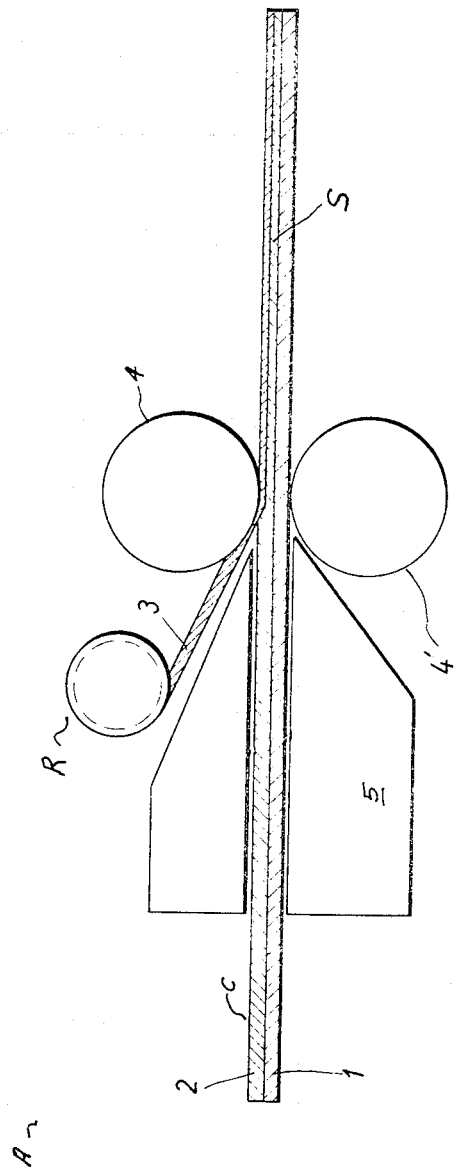

3,276,103
METHOD OF APPLYING A THIN BEARING METAL STRIP TO A POROUS LAYER OF A COMPOSITE BACKING STRIP
Günter Köpke, Heilbronn (Neckar), and Friedrich Wilhelm Rabenau, Neckarsulm, Germany, assignors to Karl Schmidt G.m.b.H., Neckarsulm, Germany, a corporation of Germany
Filed Feb. 24, 1965, Ser. No. 434,825
Claims priority, application Germany, Feb. 29, 1964, Sch 34,736
5 Claims. (Cl. 29—149.5)

This invention relates in general to the manufacture of friction bearings and more particularly to a friction bearing material having a porous metal sponge load bearing structure which is impregnated by a soft bearing metal coating, and a process for manufacturing such a friction bearing material in the form of strips or sheets which can be cut to the size and formed to the shape required for assembly into completed bearing shells.

In the typical coated strip bearings of the prior art, a steel strip either by itself, or in combination with an adherent sponge metal layer, served as the underlayment or backing strip for the bearing metal coating.

Various types of bearing metals, such as white metal, and corrosion proof lead alloys have been used as friction bearing coatings. For example, one known coated bearing has a steel backing strip and a corrosion-proof lead alloy coating adherent thereto. This particular coated bearing is manufactured by applying the lead alloy to the steel backing strip under pressure in a furnace. Another known coated bearing is made by immersing a metallic sponge strip into a bath of molten bearing metal, or by applying bearing metal in the fused state upon the sponge strip, so that the bearing metal penetrates into the sponge strip pores.

The coated bearing of the instant invention comprises a steel strip base layer, and a layer or porous material adherent thereto, such as, for example, a porous bronze layer sintered to the steel strip, so as to form a composite backing strip, and a strip of bearing metal laid upon the porous layer of said composite backing strip, with the underlying portion of said bearing metal strip extending into the pores of the porous layer.

To manufacture such a coated bearing according to the process of the invention, it is not necessary to handle molten bearing metal, or bearing metal in a fusible state, as in the case of prior art coated bearing manufacturing processes. According to the instant invention, such a coated bearing can be made from a strip or foil of bearing metal in the cold state i.e. at room temperature, with said bearing metal being applied to the porous layer of the composite backing strip by rolling under a pressure which forces the bearing metal into the pores of said porous layer.

Although by rolling solid state bearing metal ribbons, or foil into the pores of a porous layer, such as sintered bronze, heating is not absolutely required, it has been found advantageous to heat the composite backing strip prior to the rolling of the bearing metal, this heating being preferably carried out under a shielding gas (ex. helium), atmosphere and by induction.

Also, according to the instant invention, the laid-on bearing metal foil can be heated with the composite strip, or the sintered porous layer alone to a temperature which causes the bearing foil to melt i.e. at or above the melting point temperature of the particular bearing foil used, and thereby penetrate the pores of said porous layer without the need for any application of pressure.

Furthermore, a coated bearing of predetermined thickness can be easily produced by applying an appropriately selected pressure, as in rolling to compress the porous layer.

It should be noted that the application of bearing metal foil according to the invention does not involve roll plating since there is no substantial stretching of either the bearing metal foil or the composite backing strip, but rather the foil is pressed normally and continuously into the porous layer, preferably with large diameter friction rolls.

The process of the instant invention need not be carried out under a vacuum, since any air within the porous layer can easily escape through the lateral edges thereof.

One advantage of the coated bearing and process according to the invention lies in the elimination of certain finishing operations, required in the prior art, such as milling, trimming off excess material, etc., as practically no reworking is required on the bearings produced according to the invention.

It is, therefore, an object of the invention to provide a coated bearing and process for manufacturing same from solid state bearing metal.

Another object of the invention is to provide a coated bearing manufacturing process as aforesaid wherein coated bearings of a selectively controlled thickness can be readily produced.

Still another and further object of the invention is to provide a process as aforesaid which can be carried out at normal atmospheric pressures in a continuous manner.

Other objects and advantages of the invention will appear in or become evident from the following detailed description and accompanying drawing in which:

FIG. 1 is a schematic illustration of a typical apparatus which can be used for producing coated bearings according to a preferred embodiment of the invention.

Referring now to FIG. 1 of the drawing which shows an apparatus A for manufacturing a bearing metal coated strip S according to the invention, C designates a composite backing strip comprising a base strip layer 1 and a porous material layer 2 bonded thereto. Bearing metal foil 3 is fed in the form of a strip or ribbon from a magazine reel R to the rollers 4 and 4' along with the backing strip C. The foil 3 is passed under the upper roller 4 so as to be laid upon the exterior surface of the porous layer 2 and forced into the pores of said layer 2 by the pressure exerted by the rollers 4 and 4'.

Thus, a continuous coated bearing strip S can be produced with cold foil 3.

If it is desired to produce a bearing strip S having a predetermined thickness which is less than the sum of the thicknesses of the base strip 1, porous layer 2, and foil 3, this can be accomplished by adjusting the spacing between the upper and lower rollers 4 and 4' respectively so as to compress the porous layer 2 and foil 3 to the desired thickness. With the process of the instant invention, the compression of the porous layer 2 is performed simultaneously with the forcing of the bearing metal foil 3 into the pores of said porous layer 2, whereas in prior art processes, the porous layer 2 was compressed first by approximately 20% and then the bearing metal was poured on under a vacuum.

Although satisfactory bonding of the foil 3 to the porous layer 2 can be achieved by cold working as aforesaid, it has been found advantageous to preheat the composite backing strip C, or at least the porous layer 2 itself prior to rolling on the foil 3. This heating is preferably performed by induction and under a shielding gas atmosphere, such as for example in an oven 5. If desired, the foil 3 can also be heated below its fusion point, so that when it is laid upon the heated porous layer 2, which is preferably heated to a temperature above the fusion point of the foil 3, said foil 3 fuses and penetrates the pores of the layer 2 without requiring any further rolling or pressure. However, it is not necessary to heat the foil 3 where the porous layer 2 is heated to a sufficiently high temperature to fuse the foil 3.

The rollers 4 and 4' can be driven by any suitable conventional means (not shown) and are preferably of a large diameter relative to the strip S thickness and provided with means (not shown) for controlling their spacing distance.

While the invention can be readily adapted for the production of coated bearing strips having various specific bearing metal coatings, porous interlayers, and base strips, as will be apparent to those skilled in the art, it has been found particularly advantageous to use white metal for the foil 3, a steel band for the base strip, and a porous layer of 2 of bronze which has been sintered onto the steel base strip by any suitable known process.

For a specific example, steel base strips 1 having thicknesses within the range of 0.5 to 3 mm. can be used advantageously in combination with a bronze porous layer 2 which has been sintered onto the base strip 1 so as to have a porosity preferably within the range of 30 to 35 percent, and a thickness between about 0.2 to 0.6 mm. The thickness of the bearing metal foil 3 to be used is preferably selected in relation to the thickness of the sintered bronze layer 2, and for a bronze layer 2 thickness range of 0.2 to 0.6 mm., a bearing metal foil 3 thickness range of 0.2 to 0.5 mm. is appropriate.

It should be noted that the thickness of bearing metal on finished coated bearing strips S will be somewhat less than that of the original foil 3 due to compression and penetration of the foil 3 into the porous layer 2. In coated bearing strips S as made by the process according to the invention, a coherent, closed thin layer of bearing metal, about 0.1 mm. in thickness extends above the porous sintered bronze layer 2 with porous layer 2 and foil 3 thicknesses within the aforesaid ranges.

The inductive heating of the composite backing strip C under shielding gas is preferably performed at a temperature between 220° C. to 380° C., and the white metal foil 3 can be maintained in a cold solidified state outside of the furnace 5.

As desired, metals and alloys other than bronze can be used for the porous layer 2, such as for example other copper-nickel alloys, as well as copper-tin and copper-lead alloys.

Where it is desired to produce a bearing strip S of predetermined thickness, with a sintered bronze porous layer 2, having a porosity of 30 to 35 percent, approximately a 20 percent reduction in thickness can be advantageously provided via the rollers 4 and 4'.

Although the instant invention has been described in terms of ribbons, and strips, it should be noted that bearing metal coatings can also be applied in accordance with the invention to backing strips C of extended width, such as might more properly be termed sheets. Such sheets or strips S of coated bearing material can be produced in a width corresponding to that required to assemble a given finished bearing, or they can be cut to the size and shape required, and formed by bending or other known means into the desired contour.

What is claimed is:

1. A process for applying a bearing metal coating to a composite backing strip having a base strip and a layer of porous material adhering thereto, which comprises heating said composite backing strip to raise the temperature of said porous material layer to at least the melting point temperature of the bearing metal to be applied, and continuously rolling a thin strip of bearing metal at room temperature upon said heated porous material layer to fuse said bearing metal into the pores thereof thereby forming a bearing metal coating adherent to the porous layer of said composite backing strip.

2. A process for applying a bearing metal coating to a composite backing strip having a steel base strip and a porous metallic layer sintered thereto, which comprises continuously heating said composite bearing strip at a temperature between 220° C. and 380° C., and continuously rolling a thin bearing metal strip at room temperature onto the porous metallic layer of said composite backing strip to force said bearing metal into the pores of said porous metallic layer thereby forming a bearing metal coating adherent thereto and extending in thickness thereabove.

3. A process for applying a bearing metal coating to a composite backing strip having a steel base strip and a porous metallic layer sintered thereto, which comprises continuously heating said composite backing strip at a temperature between 220° C. and 380° C. in a shielding gas atmosphere, and continuously rolling a white metal foil at a temperature below its fusion point onto the porous metallic layer of said composite backing strip to force said white metal foil into the pores of said porous metallic layer thereby forming a white metal bearing coating adhering thereto and extending in thickness thereabove.

4. A process for applying a bearing metal coating to a composite backing strip which comprises continuously heating a composite backing strip having a steel base strip 0.3 to 0.5 mm. thick and a porous bronze layer 0.2 to 0.6 mm. thick adherent thereto at a temperature between 220° C. and 380° C., and continuously rolling a white metal bearing foil 0.2 to 0.5 mm. thick onto said porous bronze layer by a pair of rollers to force said white metal foil into the pores of said porous bronze layer thereby forming a white metal bearing coating adherent thereto and extending approximately 0.1 mm. in thickness thereabove.

5. The process according to claim 4 wherein said composite backing strip is heated inductively in a furnace, and wherein said white metal bearing foil is rolled onto the porous bronze layer by a pair of rollers having diameters which are large in relation to the thickness of the coated bearing strip produced.

References Cited by the Examiner

UNITED STATES PATENTS

| | | | |
|---|---|---|---|
| 2,178,529 | 10/1939 | Calkins et al. | 29—149.5 |
| 2,332,733 | 10/1943 | Lignian | 29—149.5 |
| 2,338,858 | 1/1944 | Lignian | 29—149.5 |
| 2,490,549 | 12/1949 | Schultz et al. | 29—470.5 |
| 2,689,380 | 9/1954 | Tait | 264—274 X |

JOHN F. CAMPBELL, *Primary Examiner.*

THOMAS H. EAGER, *Examiner.*